(12) United States Patent
Despins

(10) Patent No.: US 7,950,682 B2
(45) Date of Patent: May 31, 2011

(54) FRONT-WHEEL DRIVEN, REAR-WHEEL STEERED VEHICLE

(76) Inventor: Colin Despins, Kewaunee, WI (US)

( * ) Notice: Subject to any disclaimer, the term of this patent is extended or adjusted under 35 U.S.C. 154(b) by 88 days.

(21) Appl. No.: 11/796,040

(22) Filed: Apr. 26, 2007

(65) Prior Publication Data

US 2008/0029326 A1 Feb. 7, 2008

Related U.S. Application Data

(60) Provisional application No. 60/795,939, filed on Apr. 28, 2006, provisional application No. 60/798,025, filed on May 5, 2006.

(51) Int. Cl.
*B62K 19/00* (2006.01)
(52) U.S. Cl. .............. 280/288.1; 280/281.1; 180/219
(58) Field of Classification Search .............. 280/288.1, 280/281.1; 180/219
See application file for complete search history.

(56) References Cited

U.S. PATENT DOCUMENTS

| | | | |
|---|---|---|---|
| 316,047 A | 4/1885 | Marble | |
| 2,589,023 A * | 3/1952 | Pattner | 280/301 |
| 3,960,392 A * | 6/1976 | Read | 280/282 |
| 3,981,516 A * | 9/1976 | Haggkvist | 280/263 |
| 4,325,565 A * | 4/1982 | Winchell | 280/282 |
| D277,744 S * | 2/1985 | Traylor | D12/111 |
| 4,721,179 A * | 1/1988 | Yamaguchi et al. | 180/219 |
| 4,858,942 A * | 8/1989 | Rodriguez | 280/233 |
| 5,042,608 A * | 8/1991 | Horiike et al. | 180/219 |
| 5,485,893 A * | 1/1996 | Summers | 180/219 |
| 5,584,494 A * | 12/1996 | Krumm | 280/288.1 |
| 5,607,171 A * | 3/1997 | Labranche | 280/288.1 |
| 5,788,254 A * | 8/1998 | Davis | 280/282 |
| 6,068,279 A | 5/2000 | Dion | |
| 6,270,103 B1 * | 8/2001 | Grimm | 280/270 |
| 6,565,106 B2 * | 5/2003 | Lopez | 280/203 |
| 6,588,786 B2 * | 7/2003 | Efflandt, Sr. | 280/261 |
| 2003/0038448 A1 * | 2/2003 | Efflandt, Sr. | 280/261 |

* cited by examiner

*Primary Examiner* — Paul N Dickson
*Assistant Examiner* — Tashiana Adams
(74) *Attorney, Agent, or Firm* — Casimir Jones SC

(57) ABSTRACT

The present invention relates to a front-wheel driven, rear-wheel steered vehicle. In particular, the present invention relates to a vehicle having one front-wheel and one rear-wheel, wherein a power source is used to drive the front-wheel and a steering apparatus is used to transfer inputs from the user to the rear-wheel, and kits for creating such vehicles.

10 Claims, 8 Drawing Sheets

FRONT-WHEEL DRIVEN, REAR-WHEEL STEERED VEHICLE

The present application claims priority to U.S. Provisional Patent Application Ser. No. 60/795,939, filed Apr. 28, 2006, and U.S. Provisional Patent Application Ser. No. 60/798,025, filed May 5, 2006, each of which are herein incorporated by reference in their entireties.

FIELD OF THE INVENTION

The present invention relates to a front-wheel driven, rear-wheel steered vehicle. In particular, the present invention relates to a vehicle having one front-wheel and one rear-wheel, wherein a power source is used to drive the front-wheel and a steering apparatus is used to transfer inputs from the user to the rear-wheel, and kits for creating such vehicles.

BACKGROUND

A vehicle having one front-wheel and one rear-wheel (e.g., a bicycle, a motorcycle, a moped, etc.) generally includes a frame, and two wheels which are inline with each other and with the frame. The vehicle is powered (e.g., via pedaling, via motor) through rotation of the wheels.

In the case of a bicycle, pedals protrude to either side of the frame, which allow the rider to power the vehicle by means of a chain and sprocket arrangement, which links the pedals to the rear-wheel (e.g., rear-wheel drive). "Handlebars" give the rider a firm hand-hold and allow the rider to steer the front-wheel, which is generally located directly below the handlebars, and which is directly connected with the handlebars so that pivoting the handlebars also pivots the front-wheel.

In the case of a motored vehicle (e.g., a moped, a motorcycle) with front and back wheels, the vehicle is powered through use of an engine which drives the rear-wheel (e.g., rear-wheel drive). As with the bicycle, handlebars give the rider a firm hand-hold and allow the rider to steer the front-wheel, which is generally located directly below the handlebars, and which is directly connected with the handlebars so that pivoting the handlebars also pivots the front-wheel.

This arrangement is the most familiar configuration vehicles having one front-wheel and one back wheel. It provides satisfactory transportation for the masses and in fact, literally billions of bicycles are in use worldwide. Virtually interchangeable bicycle components are readily available such vehicles having this overall configuration. However, the actual maneuverability, handling, and stability of the conventional two-wheeled vehicle leaves something to be desired.

In particular, the rear-wheel drive, front-wheel steering arrangement of conventional vehicles with one front-wheel and one rear-wheel renders the vehicle unstable in certain situations. For example, when the vehicle must stop suddenly to avoid an obstacle, the front-wheel is charged with both steering the vehicle and providing the majority of the braking. Unfortunately the "tire patch" (that portion of the tire in contact with the road surface) has only a limited amount of frictional interaction with the road surface to accomplish both tasks. If the frictional "ability" of the tire patch is exceeded, the wheel may skid uncontrollably—resulting in a fall for the rider. This scenario is especially acute in a downhill, sudden-stop situation, and when traveling upon gravel, wet roads, or other less-than-favorable road surfaces.

In addition, the rear-wheel drive of such vehicles makes it difficult for the rider to, for example, overcome obstacles and climb hills presented directly to the front tire. For example, rear-wheel drive makes it especially difficult for the rider of a bicycle to travel up a curb or similar stationary object. Typically a rider is forced to "hop" the front-wheel onto the curb, since even considerable pedaling and subsequent torque at the rear-wheel will not cause the front-wheel to climb the curb. However, such practice compromises the stability of the rider and could easily result in a fall. Even worse, many riders are forced to dismount their bicycle and lift it over or onto the obstacle before they can continue riding.

Improved vehicles having one front-wheel and one rear-wheel are needed. In particular, vehicles having one front-wheel and one rear-wheel with improved steering and improved weight distribution for the driver are needed.

SUMMARY OF THE INVENTION

The present invention relates to a front-wheel driven, rear-wheel steered vehicle. In particular, the present invention relates to a vehicle having one front-wheel and one rear-wheel, wherein a power source is used to drive the front-wheel and a steering apparatus is used to transfer inputs (e.g., direct input from the user, hydraulic input from the user, manipulation of a chain from a user, manipulation of a pedal from a user, manipulation of a gear from a user, electronic input from the user, digital input from the user) from the user to the rear-wheel.

In certain embodiments, the present invention provides a vehicle comprising one front-wheel attached to the front end of a frame, and one rear-wheel attached to the rear end of the frame, wherein the vehicle has front-wheel drive and rear-wheel steering; wherein the frame comprises a seat positioned below the horizontal midpoint of the frame and in the rear end of the frame. In some embodiments, the vehicle has a power source configured to drive the front-wheel drive. In some embodiments, the power source is an engine. In some embodiments, the power source is a pedal based system. In some embodiments, the power source rotates the front-wheel. In some embodiments, the front-wheel is rigidly attached to the front end of the frame such that the front-wheel is unable to move laterally. In some embodiments, the rear-wheel is attached to the rear end of the frame such that the rear-wheel is able to move laterally. In some embodiments, the power source is configured for manual operation. In some embodiments, the frame further comprises a steering apparatus configured to steer the rear-wheel. In some embodiments, the steering apparatus is a handlebar.

In certain embodiments, the present invention provides a vehicle comprising one front-wheel attached to the front end of a frame, and one rear-wheel attached to the rear end of the frame, wherein the vehicle has front-wheel drive and rear-wheel steering; wherein the frame comprises a power source positioned below the horizontal midpoint of the frame and in the front end of the frame, wherein the power source is configured to drive the front-wheel drive. In some embodiments, the frame has a seating arrangement. In some embodiments, the power source is an engine. In some embodiments, the power source is a pedal based system. In some embodiments, the power source rotates the front-wheel. In some embodiments, the front-wheel is rigidly attached to the front end of the frame such that the front-wheel is unable to move laterally. In some embodiments, the rear-wheel is attached to the rear end of the frame such that the rear-wheel is able to move laterally. In some embodiments, the power source is configured for manual operation. In some embodiments, the frame further comprises a steering apparatus configured to steer the rear-wheel. In some embodiments, the steering apparatus is a handlebar.

In certain embodiments, the present invention provides a kit for converting a front-wheel steered, rear-wheel powered bicycle into rear-wheel steered, front-wheel powered bicycle, comprising instructions, and a swing bar. In some embodiments, the swing bar comprises handlebars. In some embodiments, the swing bar comprises a wheel. In some embodiments, the swing bar is configured to engage a front-wheel steered, rear-wheel powered bicycle such that the swing bar is secured with the front-wheel steered, rear-wheel powered bicycle. In some embodiments, the kit further comprises a standard bicycle. In some embodiments, the kit further comprises an attachable seat configured to attach onto the main frame of the front-wheel steered, rear-wheel powered bicycle. In some embodiments, the instructions describe how to convert the front-wheel steered, rear-wheel powered bicycle into rear-wheel steered, front-wheel powered bicycle with the swing bar.

DETAILED DESCRIPTION

The following discussion relates to a front-wheel driven, rear-wheel steered vehicle in accordance with certain preferred embodiments of the present invention. FIGS. 1-8 illustrate various preferred embodiments of the vehicles of the present invention. The present invention is not limited to these particular embodiments.

In preferred embodiments, the vehicles of the present invention have one front-wheel attached with the front end of a frame, and one rear-wheel attached with the rear end of the frame. The vehicle is driven, however, through rotation of the front-wheel, and steered through the rear-wheel. In some embodiments, the seating arrangement for the vehicle is positioned behind the vertical midpoint of the vehicle and below the horizontal midpoint of the vehicle so as to provide superior weight distribution and balance. As such, the present invention provides front-wheel driven, rear-wheel steered vehicles having a seat positioned below the midpoint of the vehicle. In preferred embodiments, the positioning of the seating arrangement approximately at or behind the vertical midpoint of the vehicle and approximately at or below the horizontal midpoint of the vehicle results in a shorter distance between the ground and the user of the vehicle, thereby reducing the gravitational force between the user and the ground. As the gravitational force between the user and the ground is reduced, the balance for the user is increased and the maneuverability (e.g., steering precision, turning ratio) for the vehicle is enhanced over traditional two-wheeled vehicles. In other embodiments, the positioning of the seating arrangement is closer to the horizontal midpoint of the vehicle than in relation to a two-wheeled vehicle with a standard seating arrangement (see, e.g., U.S. Pat. No. 6,588,786). Such an improvement is particularly noticed when the vehicle is engaged in a turn. For example, reduction of the gravitational force between the ground and the vehicle provides the vehicle with improved balance and improved maneuverability.

The vehicles of the present invention have numerous advantageous over two-wheeled vehicles employing front-wheel drive. For example, U.S. Pat. No. 316,047 describes an early attempt at providing front-wheel drive in a two-wheeled vehicle, but the seating arrangement is positioned above its horizontal midpoint and the vehicle uses the front-wheel for both drive and steering. U.S. Pat. No. 6,068,279 describes two-wheel drive by driving the front-wheel in addition to the rear-wheel, but the seating arrangement is positioned above its horizontal midpoint and the vehicle uses the front-wheel for both drive and steering. U.S. Pat. No. 6,588,786 describes a bicycle with front-wheel drive and rear-wheel steering, however, the seat is positioned far above the horizontal midpoint resulting in diminished weight distribution and balance.

I. Rear-Wheel Steered, Front-Wheel Powered Vehicles of the Present Invention

Figure 1:
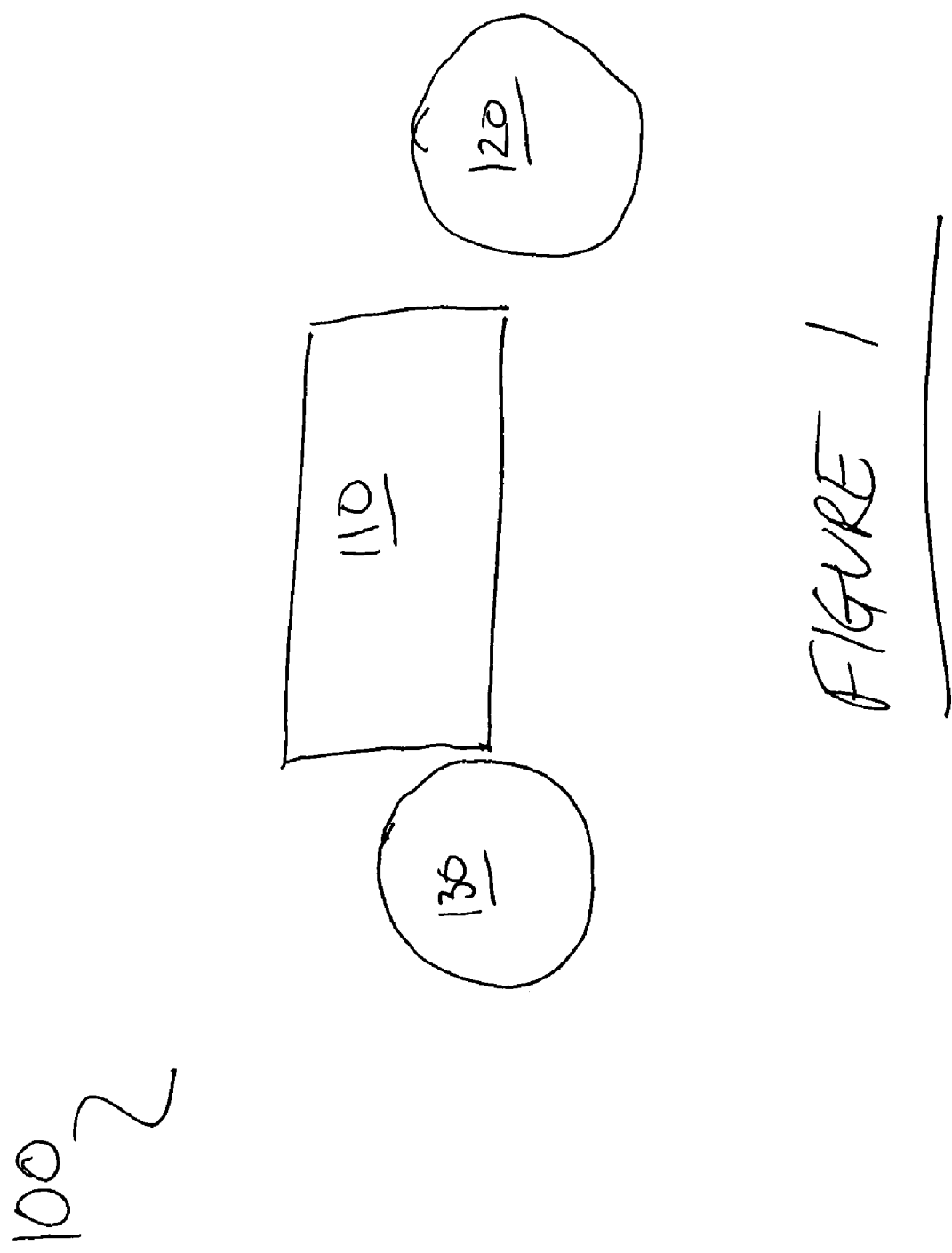
FIG. 1 schematically shows a vehicle of the present invention.

FIG. 1 shows a schematic view of a vehicle 100 of the present invention. The vehicle 100 is not limited to a particular size. In some embodiments, the length of the vehicle 100 is approximately four feet (e.g., 2 feet, 2.5 feet, 3 feet, 3.5 feet, 4 feet, 4.5 feet, 5 feet). In some embodiments, the height of the vehicle 100 is approximately three feet (e.g., 2 feet, 2.5 feet, 3 feet, 3.5 feet, 5 feet). The vehicle 100 is not limited to a particular design configuration. In preferred embodiments, the vehicle 100 generally comprises a frame 110, a front-wheel 120, and a rear-wheel 130.

Figure 2:
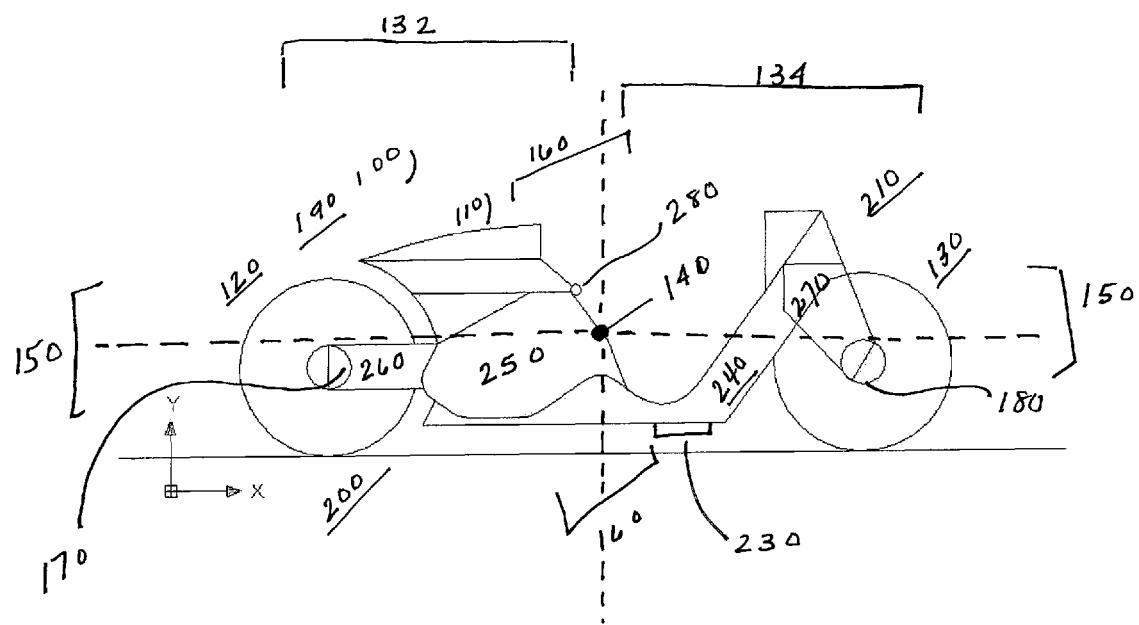
FIG. 2 shows a drawing of a vehicle of the present invention.

FIG. 2 shows a side view of a vehicle 100 of the present invention. As shown, the vehicle 100 has a frame 110, a front-wheel 120, and a rear-wheel 130. The front-wheel 120 is not limited to a particular type of material composition (e.g., rubber, metal, plastic, Kevlar, etc. or combination thereof). The front-wheel 120 is not limited to a particular size. In some embodiments, the front-wheel 120 has spokes. In some embodiments, the front-wheel 120 does not have spokes. In some embodiments, the front-wheel 120 has an outer rim.

Still referring to FIG. 2, in some embodiments, the front-wheel 120 is configured to engage the frame 110. The front-wheel 120 is not limited to a particular manner of engaging the frame 110. In some embodiments, the front-wheel 120 has a front-wheel hub 170 for engaging the frame 110. In some embodiments, the front-wheel hub 170 and the frame 110 engage in a manner such that the front-wheel 120 is restricted from lateral movement. In some embodiments, the front-wheel hub 170 and the frame 110 engage in a manner such that the front-wheel 120 is not restricted from rotational movement. In some embodiments, the front-wheel 120 is positioned in parallel alignment with the frame 110.

Still referring to FIG. 2, the rear-wheel 130 is not limited to a particular type of material composition (e.g., rubber, metal, plastic, Kevlar, etc. or combination thereof). The rear-wheel 130 is not limited to a particular size. In some embodiments, the rear-wheel 130 has spokes. In some embodiments, the rear-wheel 130 does not have spokes. In some embodiments, the rear-wheel 130 has an outer rim.

Still referring to FIG. 2, in some embodiments, the rear-wheel 130 is configured to engage the frame 110. The rear-wheel 130 is not limited to a particular manner of engaging the frame 110. In some embodiments, the rear-wheel 130 has a rear-wheel hub 180 for engaging the frame 110. In some embodiments, the rear-wheel hub 180 and the frame 110 engage in a manner such that the rear-wheel 130 is not restricted from rotational or lateral movement.

Still referring to FIG. 2, the frame 110 has therein a front-region 132 and a rear-region 134. The front-region 132 and rear-region 134 are separated at the frame center point 140 through which runs a horizontal axis 150 and vertical axis 160. The front-region 132 has therein an upper front-region 190 located above the horizontal axis 150 and a lower front region 200 located below the horizontal axis 150. The rear-region 134 has therein an upper rear-region 210 located above the horizontal axis 150 lower rear-region 220 located below the horizontal axis 150.

Still referring to FIG. 2, the frame 110 has a seating area 230 configured to accommodate (e.g., bear weight) a user in a sitting position. The vehicle 100 is not limited to a particular type of seating area 230 (e.g., seat cushion, banana seat, standard bicycle seat, standard motorcycle seat, standard moped seat). The seating area 230 is not limited to particular size dimensions (e.g., width, length). The seating area 230 is not limited to a particular material composition (e.g., plastic, ceramic, Kevlar, leather, metal, wood, or mixture thereof). The seating area 230 is not limited to a particular position within the frame 110. In some embodiments, the seating area 230 positioned within the lower rear-region 220. In some embodiments, the seating area 230 has a back-rest 240. In some embodiments, the back-rest 240 is positioned within the lower rear-region 220. In some embodiments, the back-rest 240 extends from the lower rear-region 220 and into the upper rear-region 210. The back-rest 240 is not limited to a particular height, thickness, or material composition. In some embodiments, the back-rest 240 extends from the seating area 230 in parallel with the vertical axis 160. In some embodiments, the back-rest 240 extends from the seating area 230 not in parallel with the vertical axis 160 (e.g., at an acute angle, at an obtuse angle).

In preferred embodiments, the seating area is configured to bear the weight of a sitting individual such that the individual's ability to balance the weight is greatly enhanced. One problem with two-wheeled vehicles employing front-wheel drive (e.g., U.S. Pat. Nos. 316,047, 6,068,279, 6,588,786) is that the seat is positioned above the midpoint of the vehicle. The vehicles of the present invention, however, have solved this balance problem by positioning the seating area below the midpoint of the vehicle and in the rear-region. Positioning of the seating arrangement approximately at or behind the vertical midpoint of the vehicle and approximately at or below the horizontal midpoint of the vehicle results in a shorter distance between the ground and the user of the vehicle, thereby reducing the gravitational force between the user and the ground. As the gravitational force between the user and the ground is reduced, the balance for the user is increased and the maneuverability (e.g., steering precision, turning ratio) for the vehicle is enhanced over traditional two-wheeled vehicles. In other embodiments, the positioning of the seating arrangement is closer to the horizontal midpoint of the vehicle than in relation to a standard two-wheeled vehicle (see, e.g., U.S. Pat. No. 6,588,786). Such an improvement is particularly noticed when the vehicle is engaged in a turn. For example, reduction of the gravitational force between the ground and the vehicle provides the vehicle with improved balance and improved maneuverability.

Referring again to FIG. 2, the frame 110 has a power source 250. The frame 110 is not limited to a particular type of power source 250 (e.g., pedaling power source, engine power source, motor power source, or combination thereof). In some embodiments, the power source 250 may be selected from, for example, a bicycle pedaling system, a motorcycle engine, a moped engine, a motorbike engine, a snow-mobile engine, a car motor, a jet engine, magnetic propulsion, an ATV engine. In some embodiments, the power source 250 is not limited to any particular size or shape. The power source 250 is not limited to a particular position within the frame 110. In some embodiments, the power source 250 is positioned in the front-region 132. The power source 250 is configured to provide power to the front-wheel 120 so as to render the vehicle a front-wheel driven vehicle. The power source 250 is not limited to a particular manner of rendering the vehicle 100 a front-wheel driven vehicle. In preferred embodiments, the power source 250 provides power for rotating the front-wheel 120. The power source 250 is not limited to a particular type of power. In some embodiments, the power source 250 is configured to provide power to the front-wheel 120 resulting in rotation (e.g., forward rotation, backwards rotation) of the front-wheel. Rotation of the front-wheel 120 results in movement of the vehicle 100. The power source 250 is not limited to a particular amount of power. In some embodiments, the power source 250 is configured to provide rotational movement of the front-wheel 120 such that the vehicle can achieve movement speeds as fast as 300 miles per hour, or as slow as 0.001 mile per hour. The power source 250 is not limited to a particular manner of rotating the front-wheel 120.

Still referring to FIG. 2, the frame 110 has a frame front-wheel attachment component 260 configured to secure the front-wheel 120 with the frame 110. In preferred embodiments, the frame front-wheel attachment component 260 secures the front-wheel 120 with the frame 110 in a manner restricting front-wheel 120 lateral movement but not restricting rotational movement of the front-wheel 120. The frame front-wheel attachment component 260 is not limited to a particular manner of engaging the front-wheel 120. In some embodiments, the frame front-wheel attachment component 260 engages the front-wheel hub 170. In preferred embodiments, the frame front-wheel attachment component 260 secures the front-wheel 120 with the frame 110 in a manner not hindering the delivery of power from the power source 250 to the front-wheel 120.

Still referring to FIG. 2, the frame 110 has a frame rear-wheel attachment component 270 configured to secure the rear-wheel 130 with the frame 110. In preferred embodiments, the frame rear-wheel attachment component 270 secures the rear-wheel 120 with the frame 110 in a manner not restricting rear-wheel 130 lateral movement and not restricting rotational movement of the rear-wheel 130. The frame rear-wheel attachment component 270 is not limited to a particular manner of engaging the rear-wheel 130. In some embodiments, the frame rear-wheel attachment component 270 engages the rear-wheel hub 180 in a manner similar to a grocery cart wheel. Use of a grocery cart type attachment permits the vehicle 100 to achieve high amounts of turn precision.

Still referring to FIG. 2, the frame 110 has a steering apparatus 280. The frame 110 is not limited to a particular type of steering apparatus 280. In some embodiments, the steering apparatus 280 is a steering wheel, a steering column, handlebars, a leverage pulley system, etc. The steering apparatus 280 is not limited to a particular position within the frame 110. In some embodiments, the steering apparatus 280 is positioned above the horizontal axis 150 in a manner similar to the handlebars of a bicycle. In some embodiments, the steering apparatus 280 is positioned below the horizontal axis 150. In preferred embodiments, the steering apparatus 280 is configured to steer the rear-wheel 130. The steering apparatus 280 is not limited to a particular manner of steering the rear-wheel 130. In some embodiments, the method of steering is similar to the handlebar mechanism described in U.S. Pat. No. 6,588,786; herein incorporated by reference in its entirety.

Still referring to FIG. 2, in some embodiments, the steering apparatus 280 is configured to reduce the speed (e.g., slow-down, break) the vehicle 100. In some embodiments, the steering apparatus 280 is configured to increase the speed of the vehicle 100. The steering apparatus 280 is not limited to a particular manner of increase or decreasing the speed of the vehicle 100. In some embodiments, the steering apparatus 280 increases the speed of the vehicle 100 by increasing the power provided to the front-wheel 120 by the power source 250 (e.g., similar to a motorcycle steering assembly). In some embodiments, the steering apparatus 280 decreases the speed of the speed of the vehicle 100 by decreasing the power to the front-wheel 120 by the power source 250 (e.g., similar to a motorcycle steering assembly). In some embodiments, the steering apparatus 280 decreases the speed of the vehicle 100 by supplying a frictional force to the front-wheel 120 and/or the rear-wheel 130 (e.g., similar to a bicycle steering assembly).

Figure 3:
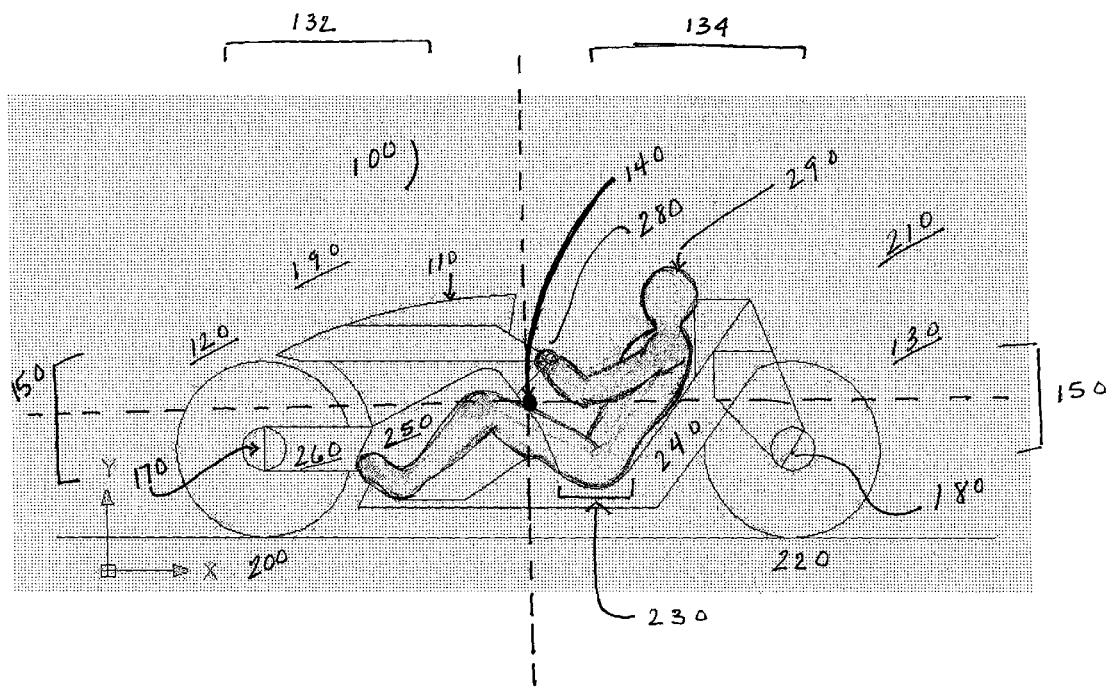
FIG. 3 shows a drawing of a vehicle of the present invention with a driver.

FIG. 3 shows a vehicle 100 of the present invention accommodating a sitting individual 290. As shown, the vehicle 100 has a front-wheel 120 connected with a frame 110 via the frame front-wheel attachment component 260, and a rear-wheel 130 connected to the frame 110 via the frame rear-wheel attachment component 270. The frame 110 further has a seating area 230, a back-rest 240, a power source 250, and a steering apparatus 280. The individual 290 is shown grasping the steering apparatus 230, leaning against the back-rest 240, and sitting on the seating area 230. The legs of the individual 290 are shown extending outwards toward the front-wheel 130. In the arrangement shown in FIG. 3, the weight of the individual 290 is distributed in the seating area 230.

Figure 4:
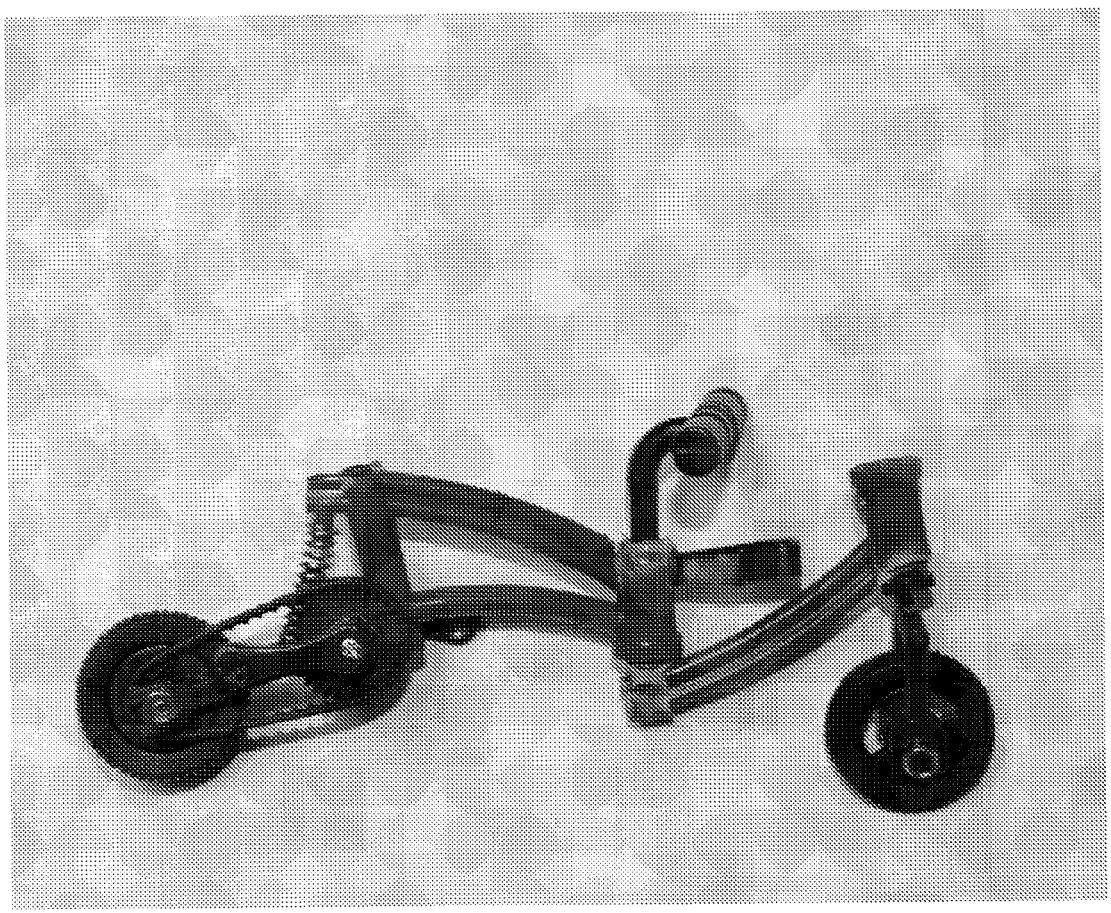
FIG. 4 shows a picture of a model of a vehicle of the present invention.

FIG. 4 shows a photograph of an embodiment model of the present invention wherein the power source is a pedaling system. As shown, the rear-wheel is configured to move independently of the frame and front-wheel. The seating arrangement is attached with the main frame so as to not impeded lateral movement of the rear-wheel. In such embodiments, the rear-wheel is free to track as the vehicle is steered. In some embodiments, the rear-wheel is a following wheel. In some embodiments, the rear-wheel is attached to the steering apparatus. In some embodiments, the vehicle is configured such that a user's feet are positioned in the front region (e.g., similar to a recumbent bicycle).

Figure 5:
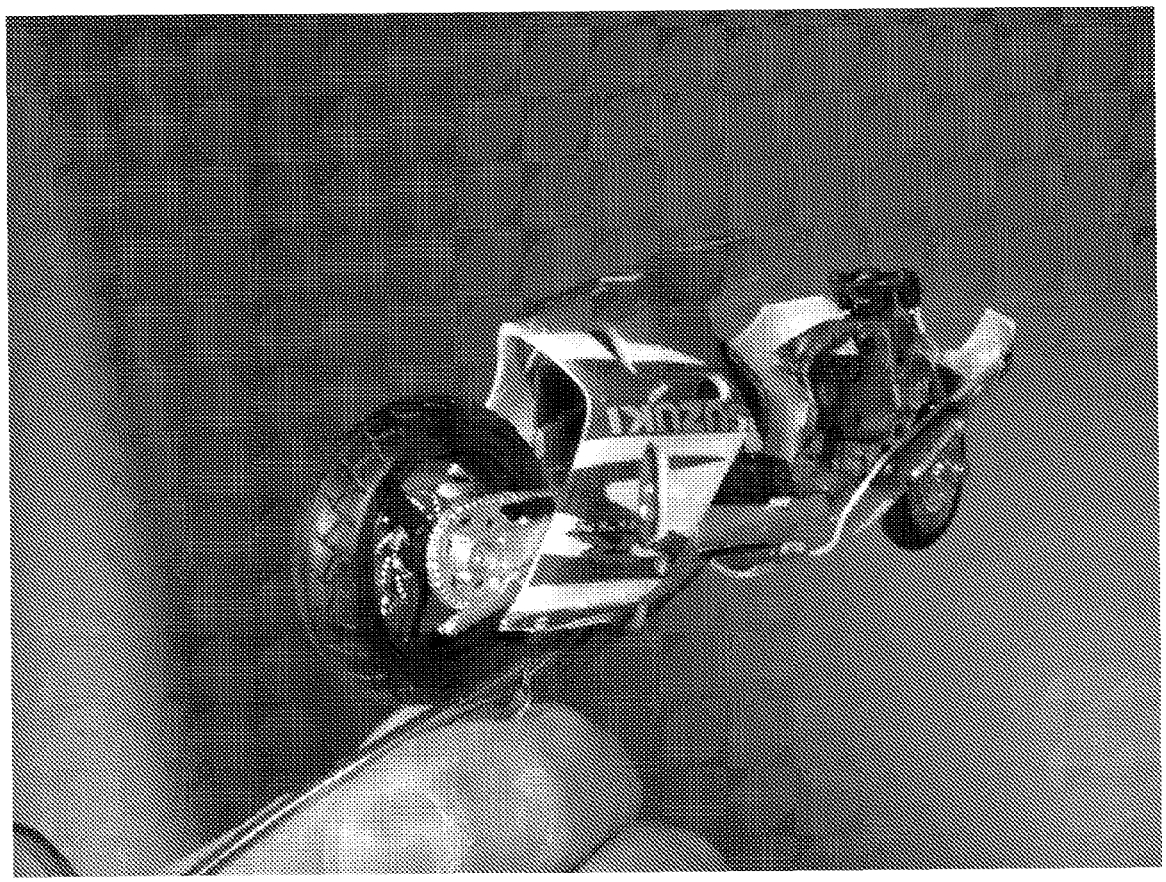
FIG. 5 shows a picture of a model of a vehicle of the present invention.

FIG. 5 shows a photograph of an embodiment model of the present invention wherein the power source is an engine or motor (e.g., a motorcycle engine). As shown, the rear-wheel is configured to move independently of the frame and front-wheel.

II. Kits for Producing Rear-Wheel Steered, Front-Wheel Powered Vehicles of the Present Invention The present invention further provides kits for use with, for example, standard two-wheeled vehicles (e.g., front-wheel steered, rear-wheel powered bicycles). The present invention is not limited to a particular kind of kit. In some embodiments, the kit is used for converting a standard two-wheeled vehicle (e.g., front-wheel steered, rear-wheel powered bicycles) into a rear-wheel steered, front-wheel powered vehicle (e.g., bicycle, motor bike). The kits are not limited to a particular contents. In some embodiments, the kits of the present invention may include any number of the following items: instructions, helmets, attachable seat(s), wheel(s), standard two-wheeled vehicle (e.g., front-wheel steered, rear-wheel powered bicycle), handlebars, welding kits, any part of a bicycle, motors, etc.

In some embodiments, the kit comprises a swing bar for attachment with a standard two-wheeled vehicle (e.g., front-wheel steered, rear-wheel powered bicycle). The swing bar is designed to engage the main frame of a standard two-wheeled vehicle. In some embodiments, the swing bar is designed to engage the main frame of a standard two-wheeled vehicle in a manner not preventing the lateral movement of the swing bar in relation to the main frame. The present invention is not limited to a particular type of swing bar.

Figure 6:
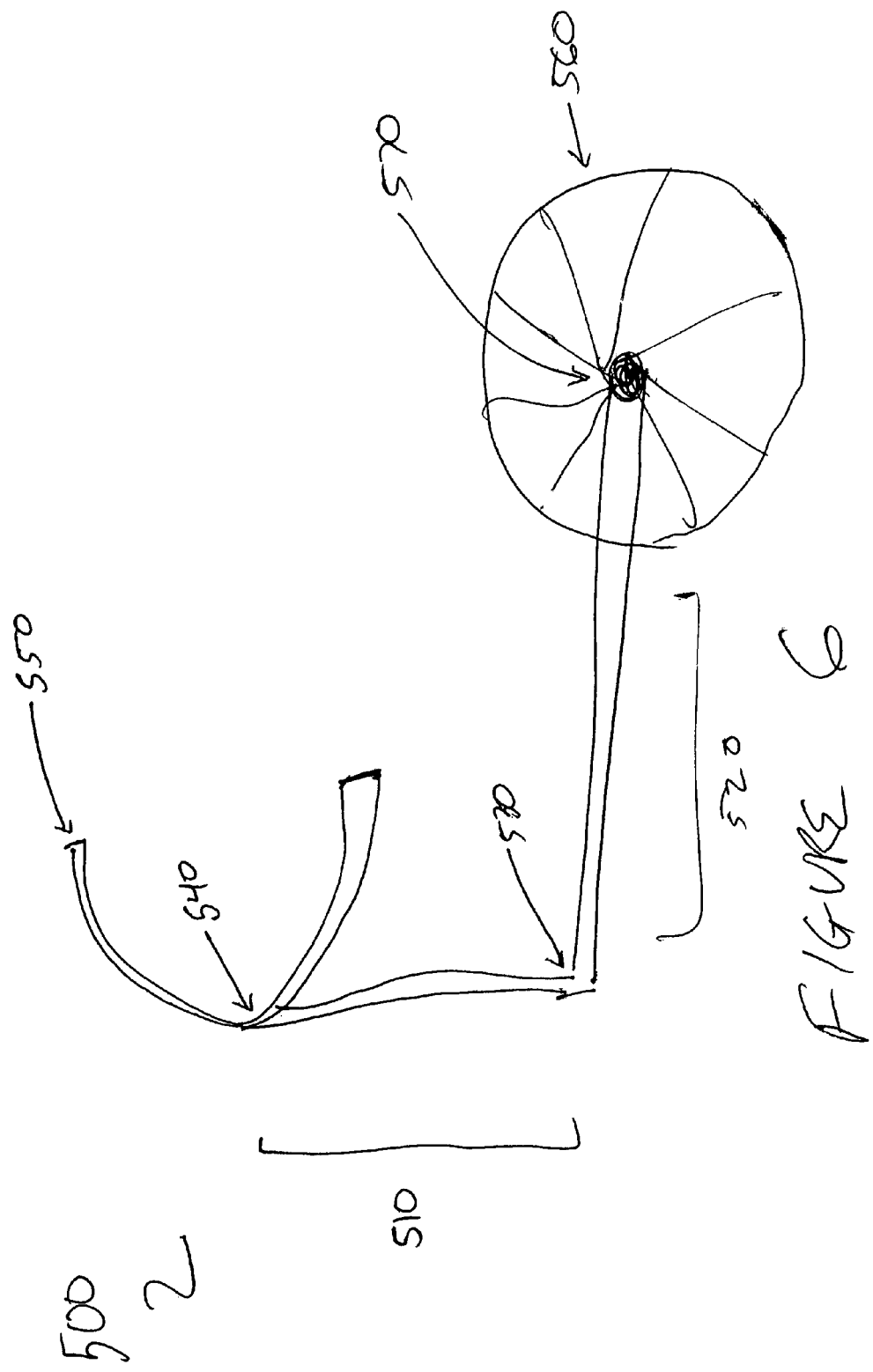
FIG. 6 shows an embodiment of a swing bar.

FIG. 6 shows an embodiment of a swing bar 500. The swing bar 500 is not limited to a particular material composition (e.g., aluminum, kevlar, plastic, fiberglass, etc.). The swing bar 500 is not limited to particular size dimensions. In preferred embodiments, the size of the swing bar 500 is such that it is able to engage a standard two-wheeled vehicle.

Still referring to FIG. 6, the swing bar 500 has a top portion 510 and a rear portion 520 connected at a midpoint 530. The top portion 510 is not limited to a particular size. In preferred embodiments, the size of the top portion 510 is designed to be consistent with the size of the main frame of a standard two-wheeled vehicle (e.g., front-wheel steered, rear-wheel powered bicycle). The top portion 510 is not limited to a particular manner of extending from the midpoint 530 (e.g., 0 to 180 degrees in relation to the midpoint 530). In preferred embodiments, the top portion 510 extends from the midpoint 530 at a 90 degree angle. In some embodiments, the top portion 510 is designed to engage the main frame of a standard two-wheeled vehicle. The top portion 510 is not limited to a particular manner of engagement.

Still referring to FIG. 6, the top portion 510 has a top end 540. In some embodiments, the top end 540 is designed to engage a steering assembly 550. The steering assembly 540 is not limited to a particular manner of steering. In some embodiments, the steering assembly 550 is configured to steer through a handlebar type assembly (e.g., an assembly similar to a standard bicycle). In some embodiments, the steering assembly 550 is configured to steer through a hydraulic assembly. In some embodiments, the steering assembly 550 is configured to steer through a gear assembly. In some embodiments, the steering assembly 550 is designed with a braking mechanism. In some embodiments, the braking mechanism is configured to hinder the movement of the front-wheel, the rear-wheel, and/or both the front-wheel and rear-wheel, simultaneously or separately.

Still referring to FIG. 6, the rear portion 520 is not limited to a particular size. In preferred embodiments, the size of the rear portion 520 is designed to be consistent with the size of the main frame of a standard two-wheeled vehicle (e.g., front-wheel steered, rear-wheel powered bicycle). The rear portion 520 is not limited to a particular manner of extending from the midpoint 530 (e.g., 0 to 270 degrees in relation to the midpoint 530). In preferred embodiments, the rear portion 520 extends from the midpoint 530 at a 0 degree angle. In some embodiments, the rear portion 520 is designed to engage the main frame of a standard two-wheeled vehicle. The rear portion 520 is not limited to a particular manner of engagement.

Still referring to FIG. 6, the rear portion 520 is configured to engage and secure a wheel 560. The rear portion 520 is not limited to a particular manner of engaging and securing a wheel 560. In preferred embodiments, the rear portion 520 engages and secures a wheel 560 so as not to restrict the rotational movement of the wheel. In some embodiments, as shown in FIG. 6, the rear portion 520 has a back end 570 configured to engage and secure a wheel 560. The back end 560 is not limited to a particular manner of engaging and securing a wheel 560.

In some embodiments, the kit further comprises an attachable seat configured to attach with the main frame of a standard two-wheeled vehicle (e.g., front-wheel steered, rear-wheel powered bicycle). The present invention is not limited to a particular type of seat, size of seat, or manner of attaching with the main frame of a standard two-wheeled vehicle.

In some embodiments, the kit comprises instructions for converting a standard two-wheeled vehicle (e.g., front-wheel steered, rear-wheel powered bicycle) into a rear-wheel steered, front-wheel powered vehicle (e.g., bicycle, motor bike). The kit is not limited to a particular type of instructions. In some embodiments, the instructions describe how to convert a standard two-wheeled vehicle (e.g., front-wheel steered, rear-wheel steered bicycle) into a rear-wheel steered, front-wheel powered vehicle (e.g., bicycle, motor bike). In some embodiments, the instructions are specific to the ingredients of the kit (e.g., attachable seat, swing bar, swing bar with handlebars, swing bar with wheel, swing bar with handlebars and wheel, etc.).

Figure 7:
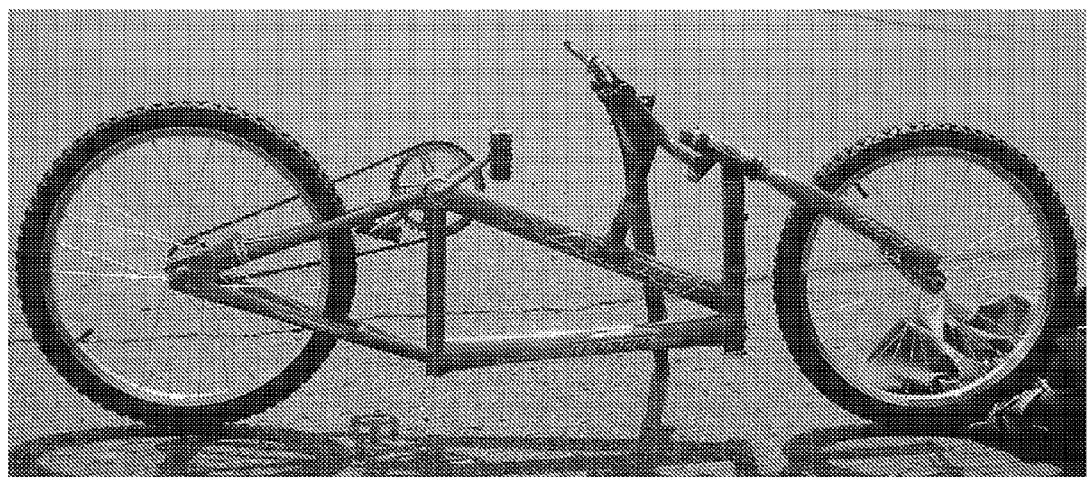
FIG. 7 shows a picture of a model of a vehicle of the present invention.
Figure 8:
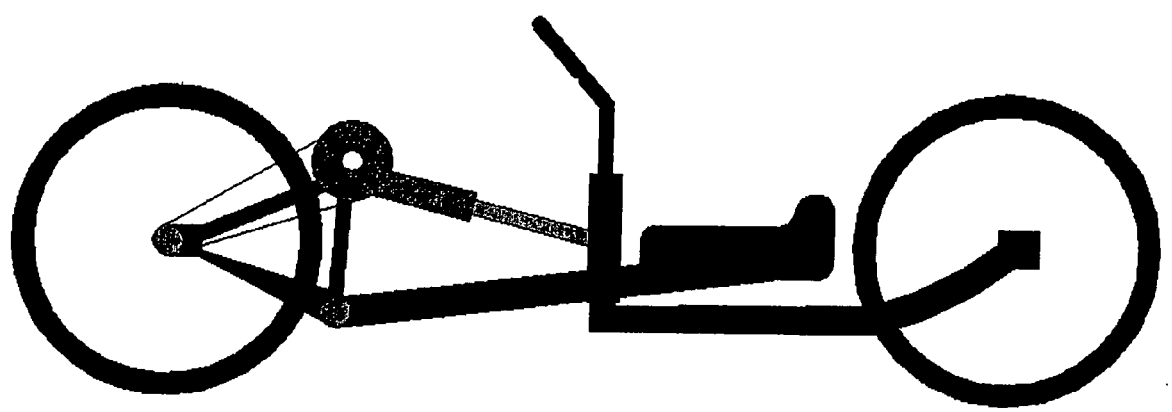
FIG. 8 shows a schematic model of a vehicle of the present invention.

In some embodiments, the kit comprises instructions, an attachable seat, and a swing bar with handlebars and wheel, wherein the kit is designed to convert a standard bicycle to a rear-wheel steered, front-wheel powered bicycle. The instructions are not limited to a particular technique or description. In some embodiments, the instructions provide, for example, a step by step description, including, but not limited to, 1) remove handlebars from standard bicycle, 2) remove front-wheel from standard bicycle, 3) remove seat from standard bicycle, 4) flip bicycle upside down, 5) engage the swing bar with handlebars and wheel with main frame of standard bicycle so as to create a bicycle complex, 6) attach attachable seat onto main frame. FIG. 7 shows a photograph of a model of a rear-wheel steered, front-wheel powered bicycle developed from a kit of the present invention. FIG. 8 shows a schematic model of a rear-wheel steered, front-wheel powered bicycle developed from a kit of the present invention.

In conclusion, the present invention provides a front-wheel driven, rear-wheel steered vehicle, and kits for creating said vehicles from a standard two-wheeled vehicle, which thereby provides a vehicle with superior handling, maneuverability, and stability. As previously noted, the invention is illustrated in the figures and in the foregoing description by example. As such illustrations are exemplative only, numerous variations may be made while adhering to the inventive concepts. Such variations are contemplated as being a part of the present invention.

I claim:

1. A vehicle comprising one front-wheel attached to the front end of a frame, wherein said front wheel is restricted from lateral movement; and one rear-wheel attached to the rear end of said frame, wherein said rear wheel is capable of lateral movement;

wherein said vehicle has front-wheel drive and rear-wheel steering, wherein a steering apparatus transfers steering inputs from the user to said rear wheel; wherein said frame comprises a power source positioned entirely below the horizontal midpoint of said frame and entirely in said front end of said frame, wherein said power source is configured to drive said front-wheel drive; and wherein said frame comprises a seat positioned below the horizontal midpoint of said frame and in said rear end of said frame.

2. The vehicle of claim 1, wherein said frame has a seating arrangement.

3. The vehicle of claim 1, wherein said power source is an engine.

4. The vehicle of claim 1, wherein said power source is a pedal based system.

5. The vehicle of claim 1, wherein said power source rotates said front-wheel.

6. The vehicle of claim 1, wherein said front-wheel is rigidly attached to said front end of said frame such that said front-wheel is unable to move laterally.

7. The vehicle of claim 1, wherein said rear-wheel is attached to said rear end of said frame such that said rear-wheel is able to move laterally.

8. The vehicle of claim 1, wherein said power source is configured for manual operation.

9. The vehicle of claim 1, wherein frame further comprises a steering apparatus configured to steer said rear-wheel.

10. The vehicle of claim 9, wherein said steering apparatus is a handlebar.

\* \* \* \* \*